United States Patent

[11] 3,608,882

[72] Inventor William F. Culp
Cuyahoga Falls, Ohio
[21] Appl. No. 851,626
[22] Filed Aug. 20, 1969
[45] Patented Sept. 28, 1971
[73] Assignee The Goodyear Tire & Rubber Company
Akron, Ohio

[54] ELASTOMERIC BUFFER MOUNTING ASSEMBLY
10 Claims, 7 Drawing Figs.
[52] U.S. Cl. .................................................. 267/140,
61/48, 248/224, 293/64, 293/71
[51] Int. Cl. .......................................................B60r 19/08,
E02b 3/22, F16f 1/36
[50] Field of Search........................................... 61/48;
248/223, 224, 309; 267/139, 140; 293/64, 71

[56] References Cited
UNITED STATES PATENTS
1,240,301  9/1917  Bower ........................... 248/224 X
1,617,280  2/1927  Viggiano ....................... 248/224 X
2,251,347  8/1941  Williams et al. ............... 267/140 X
2,723,704  11/1955 Burden .......................... 248/224 X
3,197,189  7/1965  Pemper et al. ................. 267/140

Primary Examiner—Arthur L. La Point
Assistant Examiner—Howard Beltran
Attorneys—F. W. Brunner and Ronald P. Yaist ABSTRACT: An improved bumper assembly for use on a rigid structure including an elongated resilient bumper member having a longitudinally extending bore in at least the top portion thereof and preferably of a D-shaped cross-sectional configuration, a mounting clip for the bumper member which is attached to the structure having retaining means attached to its lower end portion to hold the bottom portion of the bumper and removable attaching elements in engagement with the bumper member to hold its top portion. The removable elements make it possible for the bumper to be installed in or removed from the bumper assembly without distortion or bending. The invention is particularly useful in providing means to absorb the impact of a moving vehicle, such as a truck, ship, or crane, as contact is made with a rigid structure.

INVENTOR.
WILLIAM F. CULP

INVENTOR.
WILLIAM F. CULP
BY
ATTORNEY

INVENTOR.
WILLIAM F. CULP

BY

ATTORNEY

ELASTOMERIC BUFFER MOUNTING ASSEMBLY

BACKGROUND OF THE INVENTION

This invention relates to resilient bumper assemblies and more specifically to improved bumper assemblies for use on substantially rigid or unyielding structures to absorb shock to which such structures are subjected by outside forces. The bumper assemblies of this invention are particularly useful for this purpose on structures, such as docks, overhead cranes, and the like.

Bumpers, sometimes referred to as dock fenders, are commonly used to absorb shock on loading docks caused by the impact of trucks, ships, and the like, against the face of the dock. They normally include a mounting means, such as a plate of steel or cast iron for attachment to the structure being protected and an elongated bumper member of resilient material, such as natural or synthetic rubber or flexible plastic, which is contacted directly by a vehicle or vessel rather than the structure itself.

The resilient bumper members have taken various forms but usually include a bore or opening extending longitudinally of the member from end to end with the hollow form thereby providing maximum give on impact. One widely used bumper configuration is the "D" section in which one side of the members is substantially flat or planar to bear against the mounting plate, and the other side is rounded or curvilinear in shape to provide ready compressibility upon impact and prevent damage to the bumper from impacts which are not in a normal or perpendicular direction to the mounting plate.

In order to install the bumper devices it has been the usual practice to provide holes in the bumper member and secure the member to the structure being protected by means of bolts or like fastening elements. For example, in the D-shaped members, the procedure has been to drill clearance holes in the rounded side of the member and boltholes in the flat side of the member and subsequently to insert a predrilled metal plate in the bore or opening and bolting the member to the structure using the metal plate to hold the bolt shoulder. This procedure has the effect of reducing the service life of the resilient bumper member not only because of the obvious damage to the bumper it causes but also because it presents a location on the bumper from which subsequent failure or deterioration is likely to originate. In addition, this procedure also is costly when the bumpers are being replaced because of the interference with work activities in the loading areas.

Needless to say, it is desirable to provide a bumper assembly in which fastening elements are not inserted through the resilient material of the bumper member. Pemper et al. U.S. Pat. No. 3,197,189 discloses such a structure. In the preferred form of this invention spaced angular clamping or retaining members are shown as an integral part of the mounting plate at spaced distances apart. Accordingly, the bumper member must be bent or distorted in order to be mounted thereon or removed therefrom. Another form of the invention shows an adjustable mounting plate to accommodate various length bumper members but this structure is obviously costly to manufacture and subject to corrosion which would prevent its adjustable parts from moving, thus interfering with its operation.

The present invention of the character to be described overcomes the disadvantages of the prior art by providing a simple, economical bumper assembly useful for imparting impact resistance to such structures as loading docks or as a stop for an overhead crane.

OBJECTS OF THE INVENTION

It is a primary object of the present invention to provide a bumper assembly for protecting a rigid structure which is both simple and economical and one in which replacement of the resilient bumper member can be accomplished in the minimum of time and with the minimum of interference with work activities.

It is another object of this invention to provide a bumper assembly which requires no fastening elements to be inserted through the resilient bumper member and one in which it is not required that the resilient bumper member be bent or distorted during installation or removal from the assembly.

It is still another object of this invention to provide an bumper assembly for a vehicle or vessel dock which can be installed in a minimum amount of time at minimum cost.

It is a further object of this invention to provide an improved bumper assembly to act as a stop for an overhead crane which can be installed in a minimum amount of time at minimum cost.

Other objects and advantages of this invention will become apparent hereinafter as the description thereof proceeds, the novel features, arrangements and combinations being clearly pointed out in the specification as well as the claims thereunto appended.

It has been found that the foregoing objects and advantages are accomplished by an improved bumper assembly, comprising: (A) a mounting member having at least a portion of a first face attached to a structure and a second face opposite to the first face having retaining means attached to the lower end portion of the mounting member, (B) at least one elongated resilient bumper member having (1) a top portion containing a longitudinally extending bore therein, (2) a bottom portion resting against and supported by the retaining means, and (3) a middle portion between the top and bottom end portions with one side resting against the second face of the mounting member and the other side of the portion exposed for contact with the forces to which the structure is subjected, and (C) at least one removable attaching element having one section extending downwardly into the bore of the bumper member in engagement therewith and another section in removable engagement with the mounting member so as to secure the top portion of the bumper member. The attaching element and the retaining means coact to hold the resilient bumper member in place against the mounting member. Since the attaching element is removable it provides means by which the bumper member may be removed or inserted easily in the assembly without the necessity of its being bent or distorted.

DESCRIPTION OF THE PREFERRED EMBODIMENTS

Figure 1:
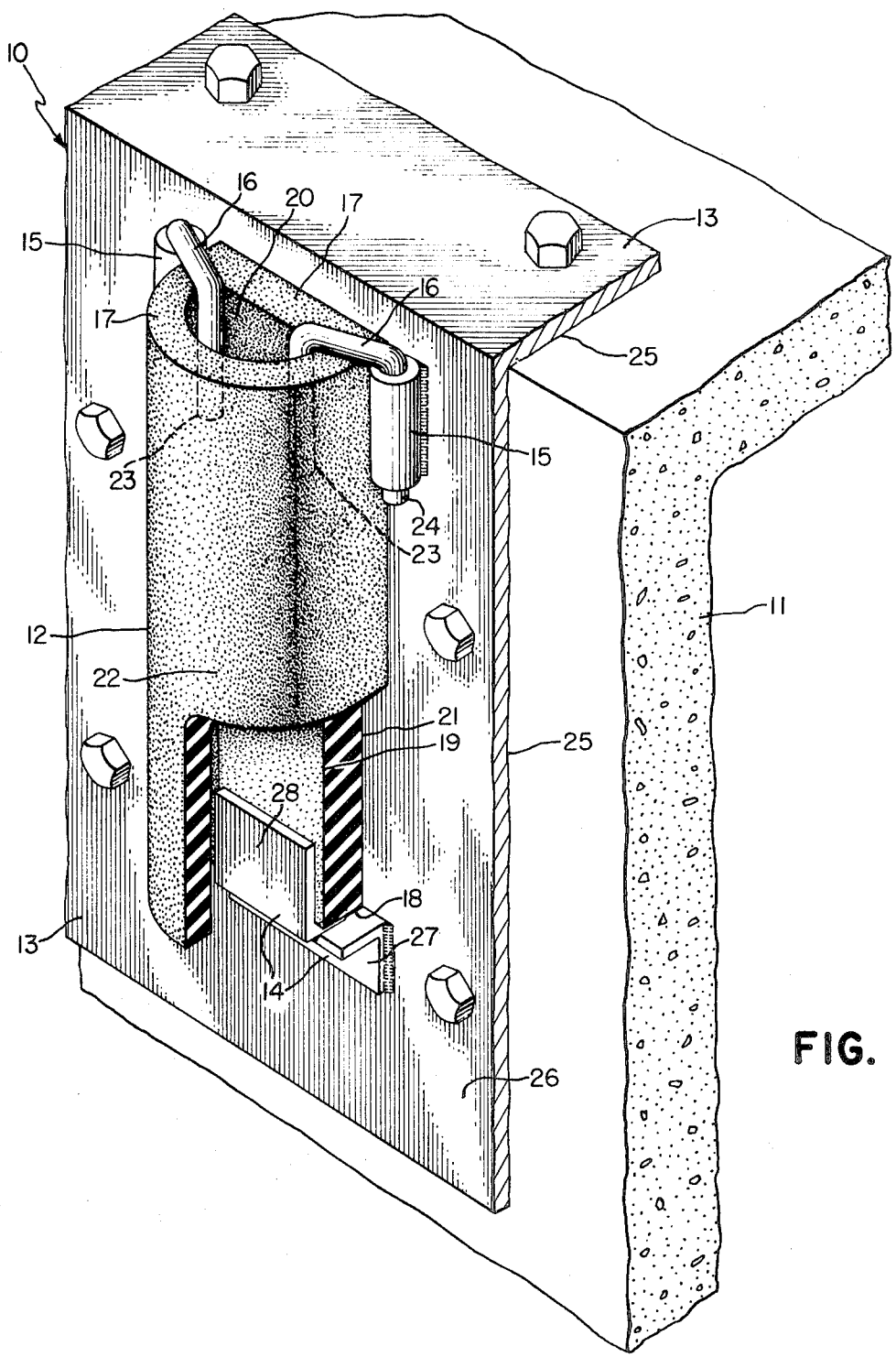
FIG. 1 is a perspective view of the bumper assembly of this invention as mounted on a dock installation with parts broken away to more adequately indicate the inventive features.
Figure 2:
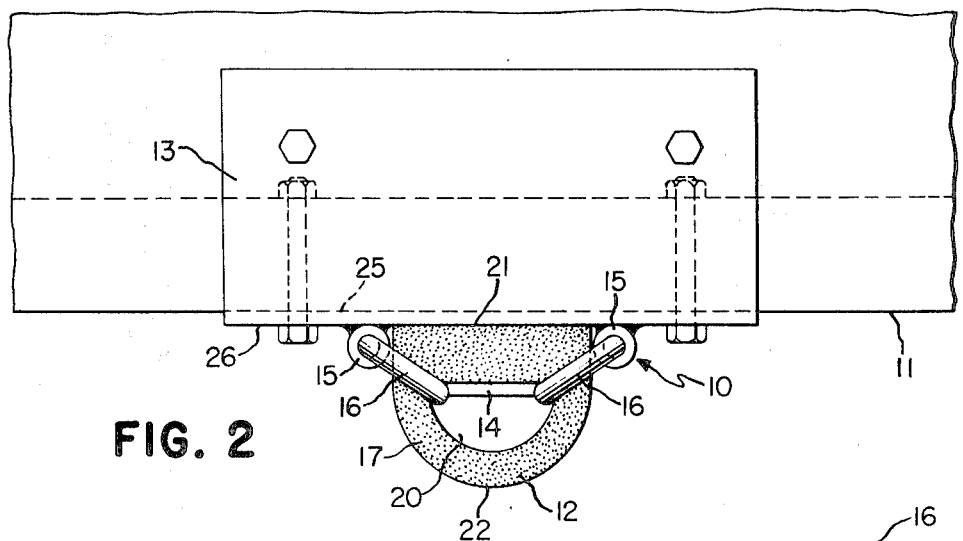
FIG. 2 is a top elevational view of the invention shown in FIG. 1.

In the drawings, FIGS. 1 and 2 show the bumper assembly 10 of this invention which in this instance, is being employed to provide means to absorb the impact of trucks against a loading dock 11 typically formed of concrete or the like rigid or unyieldable material. The bumper assembly 10 in general includes an elongated resilient bumper member 12 and a mounting member 13 therefor in the form of a large angular metal plate or angle iron. The mounting plate 13 has retaining means in the form of an angular retaining clip 14 attached to the lower portion of the plate 13 which holds the bottom of the bumper member 12 in position and preferably also includes tubular elements 15 fixed to the upper portion of the mounting plate 13 on each side of the bumper member 12. Removable attaching elements 16 hold the top of the bumper member 12 firmly in place in a manner that will be hereinafter described.

The bumper member 12 is normally an extruded length of resilient elastomeric material, such as natural or synthetic rubber, or rubber like material. The bumper 12 is an integral structure which includes a top portion 17 and a bottom portion 18 with a middle portion 19 therebetween. The bottom portion 18 of the bumper 12 rests against and is supported by the retaining clip 14. The bumper 12 also includes a longitudinally extending opening or bore 20 which preferably extends therethrough from end to end. The bumper 12 has one substantially planar or flat side 21 which rests against the mounting plate 13 with the opposite side 22 being curved or rounded facing outwardly to engage the end of the truck vehicle as it is moved into position against the dock 11 for loading or unloading. In the particular structure illustrated, the bumper 12 is D-shaped in cross section but it should be recognized that other cross-sectional configurations may be used if desired.

Figure 3:
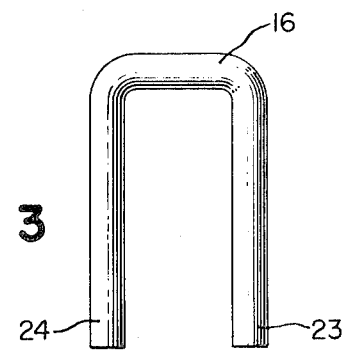
FIG. 3 is an enlarged side elevational view of the removable attaching clip of this invention.

The top portion 17 of the bumper 12 is firmly held by removable attaching clips 16 which in the form illustrated are generally U-shaped with one leg 23 extending into the bore 20 of the bumper 12 and the other leg 24 inserted in the tubular element 15 on the mounting plate 13. Preferably, the span between the legs 23 and 24 of each attaching clip 16 is such that it snugly engages the bumper 12 and each tubular element 15 when in position. However, it is also possible that a relatively loose engagement be maintained between the clips 16 and the bumper 12 and element 15 depending upon the amount and location of the impact from the vehicle or vessel For example, if the impact occurs at a location in the middle 19 or bottom portion 18 of the bumper 12 only a loose engagement is necessary. FIG. 3 shows the attaching clip 16 when removed from the assembly 10.

Figure 4:
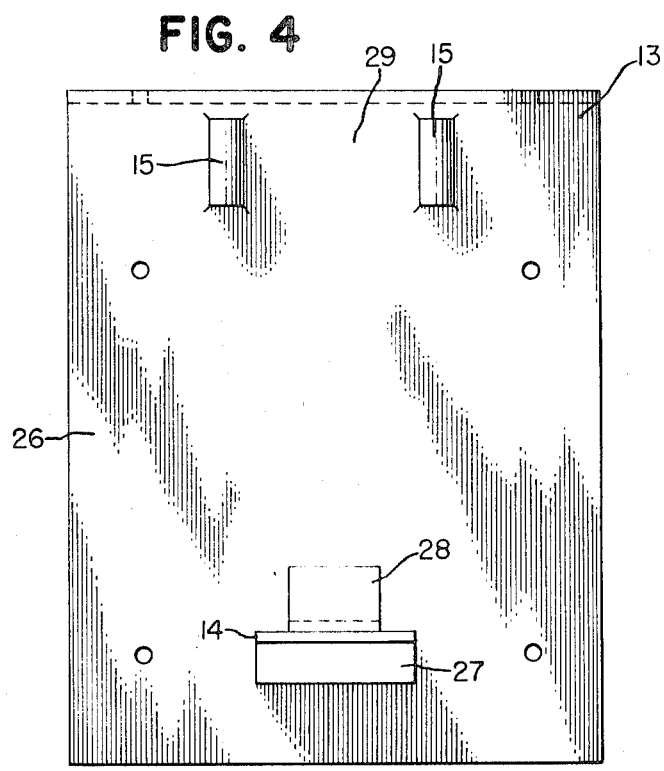
FIG. 4 is a front elevational view of the mounting plate of the bumper assembly of this invention shown with the resilient bumper member removed
Figure 5:
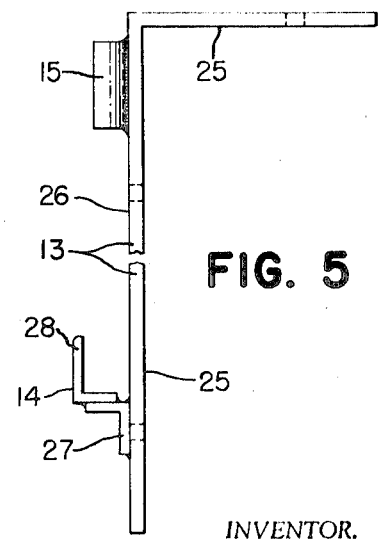
FIG. 5 is a side elevational view of the mounting plate shown in FIG. 4.

In the specific structure of the mounting member or plate 13 most clearly shown in FIGS. 4 and 5, one face 25 of the angular mounting plate 13 is attached to the dock 11 by any suitable means well known in the art, such as by bolting. An opposite face 26 of the mounting plate 13 is provided with a fixed retaining means in the form of an angular retaining clip 14. The clip 14 has one portion 27 which, for example, is welded to the lower portion of the plate 13 and a second portion 28 extending upwardly substantially parallel to and spaced from the face 26 of the plate 13 to engage a portion of the surface of the interior of the bore 20 of the bumper 12. Hollow tubular elements in the form of metal pipes or tubes 15 are fixed to the plate 13 adjacent the area 29 which is occupied by the bumper 12 in the complete assembly 10.

In the normal practice of this invention a plurality of the bumper assemblies 10 are positioned at spaced intervals along the face of the dock structure 11 to provide shock resistance therefor. It is also possible to position the bumper assemblies of this invention directly onto the truck or other vehicle if desired. In addition, the bumper members 12 may be positioned vertically, horizontally, or angularly on the mounting plate 13 depending upon the particular application.

Figure 6:
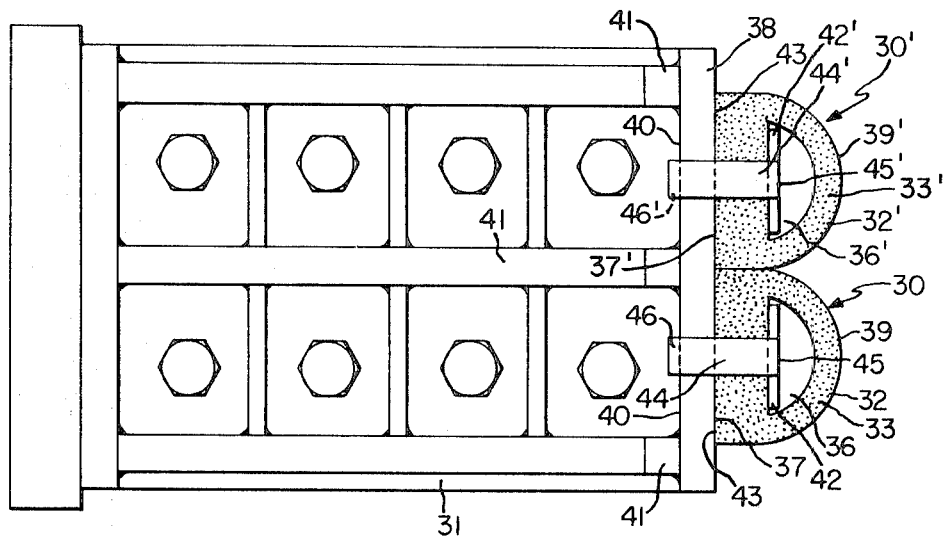
FIG. 6 is a top elevational view of the bumper assembly of this invention showing another application therefor.
Figure 7:
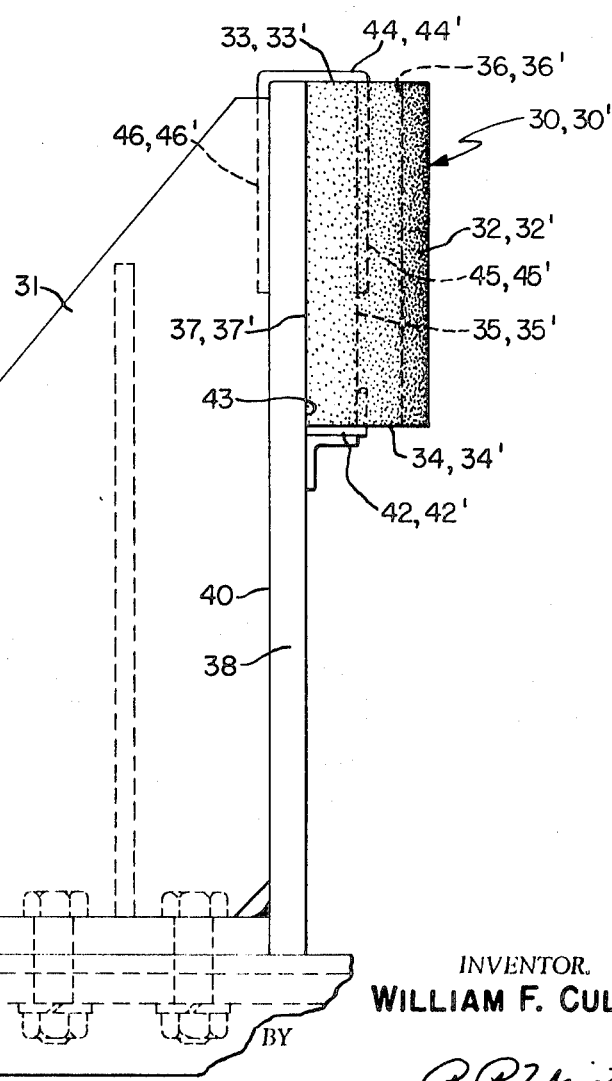
FIG. 7 is a side elevational view of the bumper assembly shown in FIG. 6.

FIGS. 6 and 7 show another application for the bumper assembly of this invention. In this case two such bumper assemblies 30 and 30' again includes an integral resilient bumper member 32 and 32', respectively, of a generally D-shaped cross section having, respectively, a top portion 33 and 33', a bottom portion 34 and 34', a middle portion 35 and 35' therebetween, and a bore 36 and 36' extending from end to end.

The bumper members 30 and 30' include substantially planar sides 37 and 37' which rests against a mounting member or plate 38 which in this instance is a frame member of the crane bumper structure 31. The opposite sides 39 and 39' are cured or rounded and face outwardly to engage the crane as it travels, for example, on an overhead track. One face 40 of the plate 38 has portions 41 attached to the remainder of the crane bumper structure 31. Retaining means in the form of retaining clips 42 and 42' are attached to the opposite face 43 of the mounting member 38 adjacent the lower portion thereof in a manner similar to that shown in FIGS. 4 and 5.

The bottom portion 34 and 34' of each bumper member 32 and 32', respectively, is held by the retaining clips 42 and 42' in the same manner previously discussed in regard to FIGS. 1 and 2. The top portion 33 and 33' of each individual bumper member 32 and 32', respectively, is held by a single attaching clip 44 and 44' preferably U-shaped when positioned in the assemblies 30 and 30'. One leg 45 and 45' of the bore 36 and 36' of each bumper member 32 and 32' and the other leg 46 and 46' of the clips 44 and 44' is in engagement with the face 40 of the mounting member 38. Although not of an absolute necessity, preferably the span between the legs 45,45' and 46,46' of the clips 44 and 44', respectively, is such that snug engagement is provided between the leg 45,45' and the interior surface of the bore 36,36' and between the leg 46,46' and the mounting frame or plate 38.

Normally, for this application, at least two or a plurality of bumper assemblies are provided as a unit in abutting side-by-side relationship as shown in FIGS. 6 and 7. The bumper units can be installed as part of a crane stop or bumper at the ends of an overhead crane track as shown or be mounted directly on the ends of the crane structure itself. It should also be recognized that this type bumper unit may be mounted directly on a vehicle or vessel to achieve the desired results.

While certain representative embodiments and details have been shown for the purpose of illustrating the invention, it will be apparent to those skilled in the art that various changes and modifications may be made therein without departing from the spirit or scope of the invention.

What is claimed is

1. An improved bumper assembly for use on a substantially unyieldable structure to absorb shock to which the structure is subjected during moving contact with another structure, said assembly comprising:
   A. a mounting member having at least a portion of a first face adapted for attachment to said structure and an opposed second face thereof having retaining means permanently fixed adjacent the bottom thereof;
   B. an elongated resilient bumper member having:
      1. a top portion containing a longitudinally extending bore therein,
      2. a bottom portion resting against and supported by said retaining means, and
      3. a middle portion between the top and bottom portions with one side thereof bearing against said second face of the mounting member, and the remaining portion extending outwardly from the mounting member to be engaged during the moving contact, with said mounting member being at least coextensive with said bumper member; and
   C. at least one separate attaching element spaced from said retaining means and having one a first section thereof extending downwardly into the bore of said bumper member in engagement therewith; and
   D. means holding a second section of said attaching element in removable engagement with and separable from said mounting member so as to secure the top portion of said bumper member, said attaching element and the retaining means thereby coacting to hold said bumper in place against said mounting member, said attaching element being thereby completely removable from said mounting member permitting easy installation and removal of said bumper member from the assembly.

2. The assembly as claimed in claim 1, wherein the attaching element is generally U-shaped clip with one leg thereof extending into the bore and the other leg thereof in removable engagement with the mounting member.

3. The assembly as claimed in claim 1, wherein said bumper member contains a longitudinally extending bore at each of the ends thereof and said retaining means is an angular retaining clip having one portion thereof extending upwardly into the bore at the bottom portion of said bumper member.

4. The assembly as claimed in claim 3, wherein said bumper member includes a substantially planar portion which rests against said second face of the mounting member, two said attaching elements engaging the surface of the bore, and the top of said second face of the mounting member includes a tubular holding element attached thereto adjacent to each side of the top portion of said bumper member, each said tubular holding element receiving the other section of each said attaching element therein.

5. The assembly as claimed in claim 1, wherein said bumper member includes a substantially planar portion which rests against said second face of the mounting member, and two said attaching elements engaging the surface of the bore, and said holding means is a tubular element permanently attached to said second face of the mounting member adjacent to each side of the top portion of said bumper member, each said tubular element receiving said second section of each said attaching element therein.

6. A bumper unit wherein a plurality of said bumper assemblies as claimed in claim 1 are mounted in side-by-side relationship.

7. In a bumper assembly for a dock including the combination of:
A. a mounting member having one face thereof attached to the dock and the opposite face thereof having an angular retaining clip permanently fixed to the bottom thereof; and
B. an elongated resilient bumper member having a longitudinal bore therethrough and having the bottom portion thereof supported by said retaining clip, a portion of which extends upwardly into said bore with said mounting member being at least coextensive with said bumper member: the improvement comprising:
C. separate attaching elements spaced from said retaining clip having one section thereof extending downwardly into the bore of said bumper member in engagement therewith; and means holding another section thereof in removable engagement with and separable from said mounting member so as to secure the top portion of said bumper member, said attaching element and the retaining means thereby coacting to hold said bumper member in place against said mounting member, and said attaching element being completely separable and removable from said mounting member to permit easy installation and removal of said bumper member in the assembly without the necessity of bending or distorting said bumper member.

8. A bumper assembly adapted for use as a crane bumper for an overhead crane comprising:
A. a platelike mounting member having a portion of one face thereof attached to the crane bumper structure and the opposite face thereof having retaining means permanently affixed thereto adjacent the bottom thereof;
B. an elongated resilient bumper member having:
  1. a top portion containing a longitudinally extending bore therein,
  2. a bottom portion resting against and supported by the retaining means, and
  3. a middle portion therebetween with one side thereof resting against said opposite face of the mounting member, and the remaining portion extending outwardly from the mounting member with said mounting member being at least coextensive with said bumper member,
C. a separate attaching element spaced from said retaining means having a first section thereof extending downwardly into the bore of said bumper member in engagement therewith; and
D. means holding a second section thereof in removable engagement with and separable from said mounting member so as to secure the top portion of said bumper member, said attaching element and the retaining means hereby coacting to hold said bumper member in place against said mounting member, and said attaching element being completely separable and removable from said mounting member thereby permitting easy installation and removal of said bumper member in the assembly, 9. A bumper unit wherein a plurality of said bumper assemblies as claimed in claim 8 are mounted in abutting side-by-side relationship.

10. The bumper assembly as claimed in claim 8 wherein said holding means is a portion of one face of said mounting member which is attached to the crane bumper structure and is in engagement with the second section of said attaching element.

PO-1050
(5/69)

UNITED STATES PATENT OFFICE
CERTIFICATE OF CORRECTION

Patent No. 3,608,882      Dated September 28, 1971

Inventor(s) William F Culp

It is certified that error appears in the above-identified patent and that said Letters Patent are hereby corrected as shown below:

Column 1, line 13, after "absorb" insert --the--.

Column 2, line 6, after "an" insert --improved--.

Column 3, line 63, after 30' insert --are employed as a unit to act as a shock absorbing crane stop or bumper 31 for an overhead crane. Each bumper assembly 30 and 30'--.

Column 4, line 12, after "the" insert --clips 44 and 44', respectively, extends downwardly into the--;

line 71, after "is" insert --a--.

Signed and sealed this 11th day of April 1972.

(SEAL)
Attest:

EDWARD M. FLETCHER, JR.
Attesting Officer

ROBERT GOTTSCHALK
Commissioner of Patents